United States Patent [19]

Hashimoto

[11] Patent Number: 4,556,761

[45] Date of Patent: Dec. 3, 1985

[54] AUTOMATIC TELEPHONE ANSWERING APPARATUS

[75] Inventor: Kazuo Hashimoto, Tokyo, Japan

[73] Assignee: Hashimoto Corporation, Tokyo, Japan

[21] Appl. No.: 471,217

[22] Filed: Mar. 1, 1983

[30] Foreign Application Priority Data

Mar. 2, 1982 [JP] Japan ................................. 57-32821

[51] Int. Cl.[4] ............................................. H04M 1/64
[52] U.S. Cl. .................................... 179/6.05; 179/6.13
[58] Field of Search .................... 179/6.13, 6.16, 6.15, 179/6.05; 360/74.1

[56] References Cited

U.S. PATENT DOCUMENTS 3,858,006 12/1974 Tomita ................................ 179/6.08
4,058,679 11/1977 Hashimoto ......................... 179/6.16

FOREIGN PATENT DOCUMENTS 2854516 3/1980 Fed. Rep. of Germany ..... 179/6.05

Primary Examiner—Alan Faber
Attorney, Agent, or Firm—Lowe King Price & Becker

[57] ABSTRACT

The invention provides an automatic telephone answering apparatus wherein a relay means is operated upon reception of an incoming call so as to form a loop circuit, and a message from among a plurality of types of messages stored in a speech synthesizer is produced and delivered to a caller in accordance with the conditions whether or not a predetermined time interval has elapsed since the incoming call was received, whether or not an external tape recorder is connected, and whether or not an incoming message recording tape has reached its end.

4 Claims, 2 Drawing Figures

AUTOMATIC TELEPHONE ANSWERING APPARATUS

BACKGROUND OF THE INVENTION

The present invention relates to an automatic telephone answering apparatus.

Conventionally, automatic telephone answering apparatuses have magnetic tape as message recording means. An incoming message recording tape and an outgoing message prerecorded tape are alternately or simultaneously used to playback a prerecorded outgoing message to a caller and/or to record an incoming message on the incoming message recording tape for a subscriber. The present inventor has previously developed an apparatus in which a unit for generating a Morse signal is used in place of the outgoing message tape so as to deliver the Morse signal instead of an outgoing message prerecorded on the tape. The above apparatus is granted as U.S. Pat. No. 4,058,679. Along with the development of electronic techniques, an IC such as a CMOS-IC has been made commercially available which has a very low current consumption in the standby mode. Therefore, it is possible to carry an automatic telephone answering apparatus and a compact tape recorder connected thereto together in a user's pocket. Furthermore, telephone line connections are modified and simplified such that a modular plug is inserted in a corresponding jack. If a user wishes to use the automatic telephone answering apparatus having the compact tape recorder connected thereto in, for example, a hotel room during a trip, he can use the apparatus with dry cells without using an AC outlet. However, in the conventional apparatus using the incoming message recording tape and the outgoing message prerecorded tape, current consumption is large. Therefore, it is not appropriate to market a portable apparatus of the conventional type since the required capacity of the dry cells is large.

SUMMARY OF THE INVENTION

It is a first object of the present invention to provide a convenient automatic telephone answering apparatus wherein a speech synthesizer such as a voice synthesizer is used for a message, which apparatus holds current consumption to less than several microamperes in the standby mode and to less than several tens of milliamperes in the operation mode, thereby allowing the use of dry cells and a modular plug plugged into a modular jack at any time, for example, in a hotel room during a trip.

It is a second object of the present invention to provide an automatic telephone answering apparatus incorporating a speech synthesizer, which apparatus may be operated to record a voice of a caller by connecting an external tape recorder thereto.

It is a third object of the present invention to provide an automatic telephone answering apparatus incorporating a speech synthesizer, which apparatus stores a plurality of types of messages to deliver a first message when a call is received, to simultaneously record a caller's voice on an external tape recorder, and to deliver a second message after a predetermined time interval has elapsed, terminate the call.

It is a fourth object of the present invention to provide an automatic telephone answering apparatus wherein the second message is delivered when the incoming call is received and when a tape end detection signal is also received, thereby restoring the automatic telephone answering apparatus to the standby mode.

It is a fifth object of the present invention to provide an automatic telephone answering apparatus wherein a third message is delivered for subsequent calls after the magnetic tape of the external tape recorder has reached its end to disable subsequent recording, thereby restoring the automatic telephone answering apparatus to the standby mode.

It is a sixth object of the present invention to provide an automatic telephone answering apparatus wherein the third message alone is delivered in response to an incoming call when the external tape recorder is not connected to or is removed from the automatic telephone answering apparatus, thereby restoring the automatic telephone answering apparatus to the standby mode.

In order to achieve the above objects of the present invention, there is provided an automatic telephone answering apparatus having a relay means which is operated to be self-held upon receipt of a telephone call, which remains self-held during the call, and which is then released when the caller hangs up the receiver, and a momentary release circuit which is operated in response to a signal upon termination of the call, wherein a loop circuit is formed upon operation of the relay means to selectively read out a proper message from among a plurality of types of messages from a speech synthesizer and to deliver it to the caller in accordance with whether or not the external tape recorder is connected, the magnetic tape on the external tape recorder has reached its end, or the predetermined time interval has elapsed since the incoming call was received, thereby releasing the relay means and restoring the automatic telephone answering apparatus to the standby mode. Since the speech synthesizer such as a voice synthesizer is used, the automatic telephone answering apparatus according to the present invention does not involve magnetic tape and drive mechanisms therefor, unlike the conventional automatic telephone answering apparatus, thus resulting in simple construction and compactness. Furthermore, according to the present invention, a mechanism for vertically moving a head to select one of various messages need not be used for the apparatus. START and BUSY terminals of the voice synthesizer are coupled to logic circuits, so that various messages corresponding to A1, A2, A3, . . . , and so on can be produced either singly or in a combination thereof when recording of the caller's voice is completed, when the magnetic tape for recording the caller's voice reaches its end, and when a response alone is required. Furthermore, even when the magnetic tape on the external tape recorder reaches its end, and even when the tape recorder is removed from the automatic telephone answering apparatus, the automatic telephone answering apparatus can still respond to the caller, thus resulting in convenience in a variety of applications.

DETAILED DESCRIPTION OF THE PREFERRED EMBODIMENT

Figure 1A:
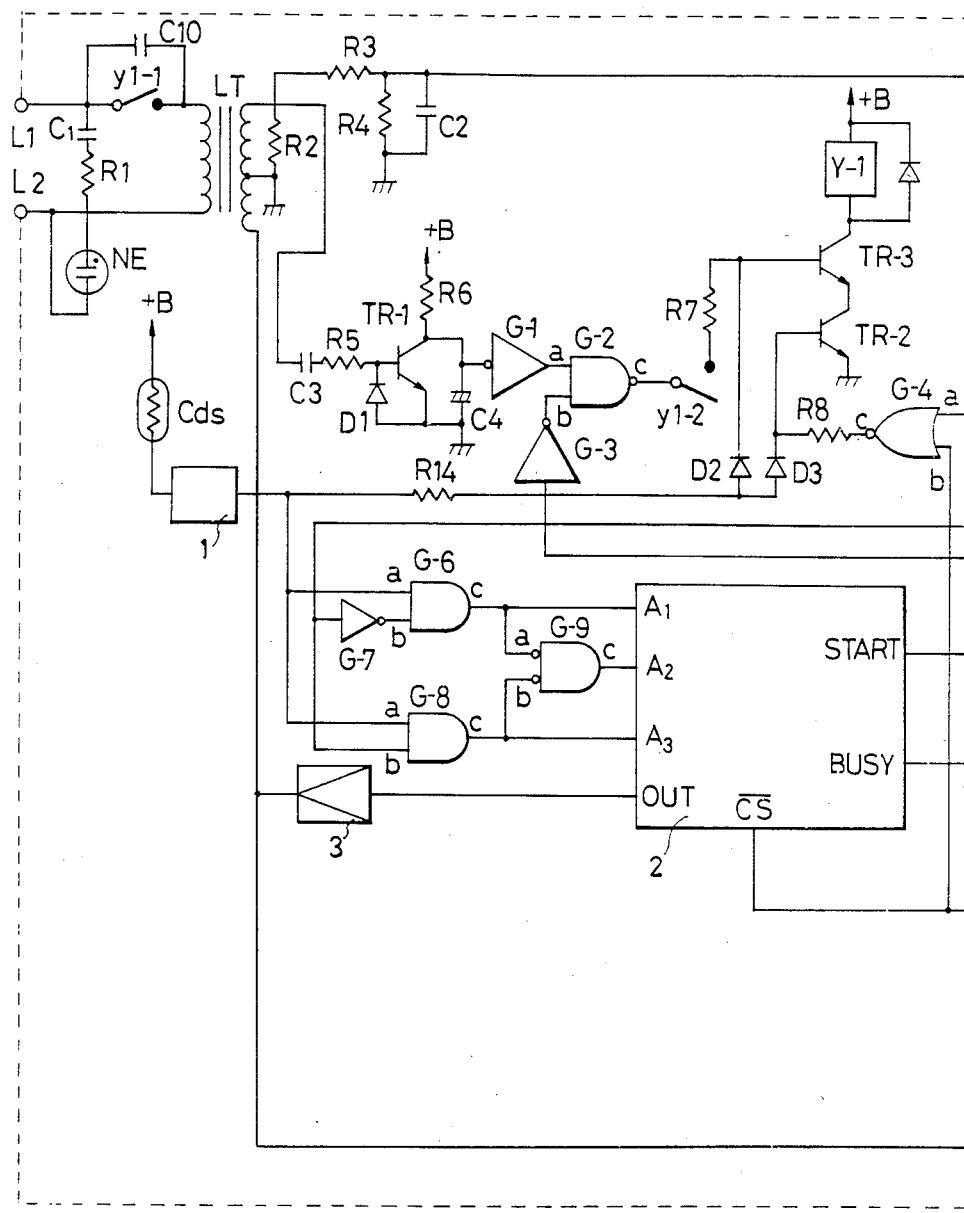
FIGS. 1(a) and 1(b) of the drawing are a circuit diagram of an automatic telephone answering apparatus according to an embodiment of the present invention.
Figure 1B:
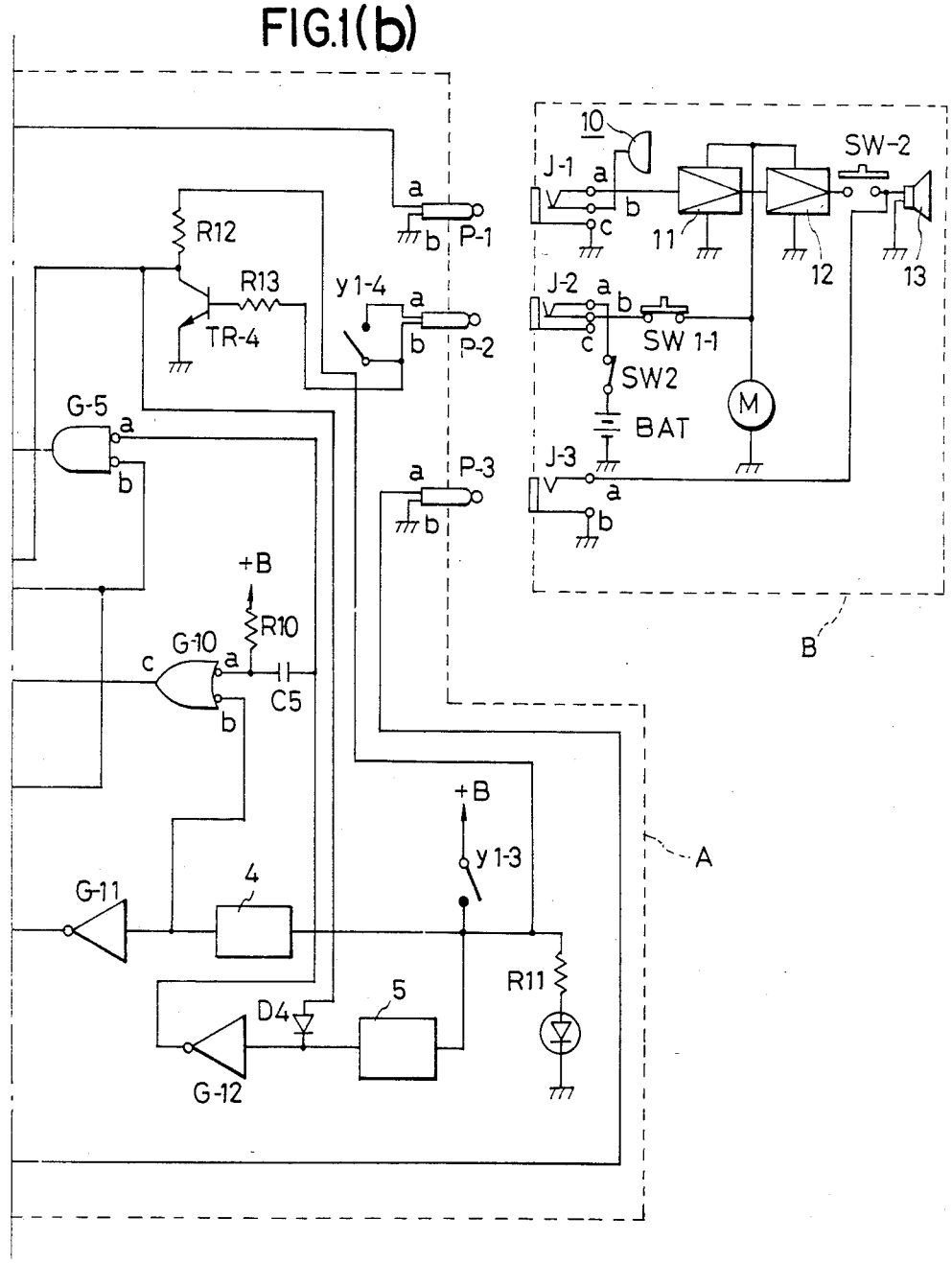

The drawing shows the main part of an automatic telephone answering apparatus according to an embodiment of the present invention. Reference symbol A denotes a control part; and B, a tape recorder connected to the control part A. Reference symbols L1 and L2 denote telephone line terminals, respectively. Reference symbol LT denotes a line transformer. A neon lamp NE and a light-receiving element Cds constitute a photocoupler for detecting a call signal. A ringing amplifier 1 produces a signal of high level for about 2 seconds after one to three call signals are supplied thereto. Reference numeral 2 denotes a speech synthesizer composed of IC or LSI. Reference symbols A1, A2 and A3 denote terminals for accessing addresses of the synthesizer; $\overline{CS}$, a chip select terminal for enabling the speech synthesizer 2; and START, a terminal which causes a terminal OUT to produce synthesized speech after one of the addresses respectively corresponding to the terminals A1, A2 and A3 is accessed and the corresponding terminal goes high. For example, when the address corresponding to the terminal A1 is accessed, a message "Please leave your message" is produced from the terminal OUT. When the address corresponding to the terminal A2 is accessed, a "hang up" message "Thank you" is produced. When the address corresponding to the terminal A3 is accessed, a "response only" message "Please call again. We are absent now" is produced.

During the above output operation, a terminal BUSY is kept high. Reference symbol G-6 denotes an AND gate; G-7, an inverter; and G-8 and G-9, AND gates, respectively. These gates are used to switch the addresses corresponding to the terminals A1, A2 and A3. An amplifier 3 amplifies the synthesized speech or message. A relay Y-1 has four contacts y1-1 to y1-4 and is started in response to the call signal. A delay circuit 4 is started when the contact y1-3 is closed. The delay circuit 4 provides a one-second delay. A timer 5 is started when the contact y1-3 is closed. The timer 5 can be adjusted in a range of 20 to 60 seconds. A transistor TR-1 for a momentary release detection circuit detects that the caller hangs up the receiver while the timer 5 is in operation. A transistor TR-4 for a determination switching circuit is kept OFF when an incoming message recording tape on the external tape recorder B to be described in detail later has reached its end, or when the external tape recorder B is not connected to the automatic telephone answering apparatus.

In the tape recorder B, reference numeral 10 denotes a built-in microphone; 11, a preamplifier; 12, a main amplifier; and 13, a speaker. Reference symbol M denotes a motor; BAT, a power source; and SW1-1 and SW1-2, manually operated switches for performing rewinding, playback and so on. The arrangement of the tape recorder B is known to those who are skilled in the art, and is thus simplified. However, in order to record the caller's voice by connecting the tape recorder B to the control part A, the tape recorder B must, of course, be set in the recording mode. It is noted that reference symbol SW2 denotes an automatic release switch when magnetic tape (not shown) reaches its end. It is also noted that the recording tape B and the control part A are connected through a plug P-1 and a jack J-1, through P-2 and J-2, and through P-3 and J-3.

The mode of operation of the automatic telephone answering apparatus having the arrangement described above will now be described hereinafter. Assume that the control part A and the tape recorder B are connected to each other and that an incoming message recording tape (not shown) has not reached its end. In this condition, a call signal is transmitted to the telephone line terminals L1 and L2, the call signal is detected by the ringing amplifier 1 through the photocoupler comprising the neon lamp NE and the light-receiving element Cds. After two or three call signals are applied to the ringing amplifier 1, the ringing amplifier 1 produces a signal of high level since the call signal is delayed by a delay circuit (not shown) having a capacitor and a resistor therein. This signal is supplied to transistors TR2 and TR3 through diodes D3 and D2 respectively, so that the transistors TR2 and TR3 are both turned ON. The relay Y-1 is then biased to close its contacts y1-1 to y1-4. When the contact y1-1 is closed, a loop circuit is formed through the primary winding of the line transformer LT. Therefore, the bell stops ringing. Since the contact y1-3 is also closed, a positive voltage from a power source +B is applied to the delay circuit 4. When one second has elapsed, the output of the delay circuit 4 goes high. The signal of high level is supplied through an inverter G-11 to the chip select terminal $\overline{CS}$ which goes low, thus rendering the speech synthesizer 2 operative. Before the chip select terminal $\overline{CS}$ goes low, the output of the delay circuit 4 is low. A signal of high level has been supplied in advance to the terminal START through pins b and c of a NOR gate G-10. Therefore, as described above, when the terminal $\overline{CS}$ goes low, a synthesized message which corresponds to one of the addresses respectively accessed at the terminals A1, A2 and A3 is produced from the terminal OUT. In the speech synthesizer IC according to the present invention, even if a signal of high level is supplied to the terminal START after the chip select terminal $\overline{CS}$ goes low, the synthesized message is produced. Further, since the contact y1-4 is closed, pins a and b of the plug P-2 are short-circuited, and hence pins a and b of the jack J-2 of the tape recorder B are short-circuited. The positive voltage from the power source BAT is applied across the motor M through the switch SW1-1, so that an incoming message recording tape (not shown) is driven. At the same time, the positive voltage from the power source BAT is applied to one end of a resistor R13 through the jack J-2 and the plug P-2, so that the transistor TR-4 is ON. The collector of the transistor TR-4 thus goes low. The signal of low level from the collector is supplied to a pin b of the AND gate G-8, and to a pin b of the AND gate G-6 through the inverter G-7. The pin a of the AND gate G-6 and the pin a of the AND gate G-8 are connected to the output end of the ringing amplifier 1. Even if the bell stops ringing, the output of the ringing amplifier 1 is held high for about 2 seconds until the charge on a capacitor (not shown) of the delay circuit in the ringing amplifier 1 is discharged. As is apparent from the figure, the pins a and b of the AND gates G-6 simultaneously go high. A pin c of the AND gate G-6 then goes high. Therefore, the terminal A1 of the speech synthesizer 2 goes high, whereas the terminals A2 and A3 thereof go low. The synthesized message "Please leave your message" which corresponds to the terminal A1 is produced from the terminal OUT. This synthesized message is then amplified by the amplifier 3 and is delivered to the caller through the line transformer LT.

As described above, when the output of the inverter G-11 goes low, a pin b of a NOR gate G-4 goes low, whereas a pin c thereof goes high. The signal of high level from the pin c of the NOR gate G-4 is supplied to the base of the transistor TR2 through a resistor R-8. The base of the transistor TR-3 is biased through a resistor R7, as described above. Therefore, even if the output signal from the ringing amplifier 1 goes low in about two seconds after the loop circuit is formed to stop producing the audible ringing signal from the ringing amplifier 1, the relay Y-1 remains held.

As described above, a caller's message received after the synthesized message corresponding to the address terminal A1 is produced is transmitted through the line transformer LT, a resistor R3, the plug P-1 and the jack J-1, and the preamplifier 11, and is recorded by a known recording circuit (not shown) on the incoming message recording tape. When the caller hangs up the receiver before the timer 5 is OFF, a momentary release pulse which is generated at the time when the caller hangs up the receiver is applied to the transistor TR-1 through the line transformer LT. While the momentary release pulse is applied to the transistor TR-1, the transistor TR-1 remains ON. Upon the ON condition of the transistor TR-1, a pin a of a NAND gate G-2 goes high through an inverter G-1. At this time, since no synthesized message is produced by the speech synthesizer 2, the terminal BUSY is kept low, and a pin b of the NAND gate G-2 is kept high through an inverter G-3. Therefore, a pin c of the NAND gate G-2 goes low. A bias voltage applied to the base of the transistor TR-3 through the contact y1-2 and a resistor R7 is cut off, so that the transistor TR-3 is turned OFF. As a result, the relay Y-1 is released and the automatic telephone answering apparatus is restored to the standby mode.

However, when the caller continues to talk even after the timer 5 is OFF (e.g., even after 30 seconds have elapsed), the terminal A2 of the speech synthesizer 2 goes high. A synthesized "hang up" message "Thank you" corresponding to the terminal A2 is produced from the terminal OUT. In this case, as may be apparent from the above description, since the output of the ringing amplifier 1 is already low, and the pins a of the AND gates G-6 and G-8 are both low, the pins c thereof go low. Pins a and b of the NAND gate G-9 go low, whereas a pin c thereof goes high. The terminal A2 of the speech synthesizer 2 then goes high. In this condition, when the timer 5 is turned off, the output of the timer 5 goes high, and the output of an inverter G-12 goes low. It is noted that a pin a of the NOR gate G-10 instantaneously goes low in response to a negative pulse from a capacitor C5. A pulse of high level is supplied from the pin c of the NOR gate G-10 to the terminal START of the speech synthesizer 2. The synthesized "hang up" message corresponding to the terminal A2 is produced so as to signal completion of the recording operation to the caller. Furthermore, the relay Y-1 is actuated to properly produce the whole synthesized message. When the timer 5 is OFF, a pin a of a NAND gate G-5 goes low, as is apparent from the above description. Meanwhile, during the time in which the "hang up" message is produced, the terminal BUSY of the speech synthesizer 2 goes high. When this signal of high level is applied to a pin b of the NAND gate G-5, a pin c of the NAND gate G-5 goes low, a pin a of the NOR gate G-4 goes low, and the pin c of the NOR gate G-4 goes high. The signal of high level from the NOR gate G-4 is applied to the base of the transistor TR-2 through the resistor R8. Thus, the relay Y-1 is actuated. However, when the "hang up" message is produced and the terminal BUSY goes low, the pins a and b of the NAND gate G-5 both go low, the pin c of the NAND gate G-5 goes high, the pin a of the NOR gate G-4 goes high, and the pin c of the NOR gate G-4 goes low. The bias voltage applied to the base of the transistor TR-2 is then cut off, so that the relay Y-1 is released and the automatic telephone answering apparatus is restored to the standby mode.

When an incoming message recording tape (not shown) mounted on the tape recorder B and set in the recording mode reaches its end, the automatic telephone answering apparatus is restored to the standby mode after the "hang up" message corresponding to the terminal A2 is produced. Thereafter, the "response only" message corresponding to the terminal A3 is produced for subsequent calls. More particularly, when the magnetic tape reaches its end during recording, the automatic release switch SW2 is opened. As may be apparent from the above description, since no voltage is then applied to one end of the resistor R13 through the jack J-2 and the plug P-2, the transistor TR-4 is OFF. The timer 5 is then rapidly charged through a resistor R12 and a diode D4, so that the timer 5 is forcibly turned OFF. In the same manner as the case in which the timer 5 is turned OFF as described above, the automatic telephone answering apparatus is restored to the standby mode after the "hang up" message corresponding to the terminal A2 is produced. In the reception of subsequent calls, immediately after the loop circuit is formed in response to the call signal, a voltage signal of high level is supplied from the transistor TR-4 to the pin b of the AND gate G-8 during which the output of the ringing amplifier 1 remains high for about 2 seconds, that is, during which the pins a of the AND gates G-6 and G-8 are kept high. The pin c of the AND gate G-8 goes high so that the address corresponding to the terminal A3 is accessed. In this condition, the terminal $\overline{CS}$ goes low through the delay circuit 4 and the inverter G-11. Since the START signal is already supplied in the manner as described above, the "response only" message corresponding to the terminal A3 is produced. Since the timer 5 is forcibly turned OFF by the diode D4, the "response only" message "Please call again" is immediately produced in the same manner as in the case where the incoming message recording tape has reached its end. After this message is produced, the automatic telephone answering apparatus is restored to the standby mode. The above operation is then repeated every time an incoming call is received.

A case in which the external tape recorder B is not connected to the automatic telephone answering apparatus is the same as the case in which the incoming call is received after the incoming message recording tape reaches its end. After the "response only" message which corresponds to the terminal A3 is produced, the automatic telephone answering apparatus is restored to the standby mode. This operation is repeated every time an incoming call is received. More particularly, when the external tape recorder B is not connected to the automatic telephone answering apparatus and when an incoming call is received, the relay Y-1 is operated and its contact y1-4 is closed. However, the transistor TR-4 is OFF. The pin b of the AND gate G-8 goes high. Further, upon reception on an incoming call, the output from the ringing amplifier 1 renders the output of the AND gate G-8 high. Thus, the address corresponding to the terminal A3 is accessed. Further, since the contact y1-3 is closed, the terminal $\overline{CS}$ is already set to low, and the START signal is already supplied, the "response only" message corresponding to the terminal A3 of the speech synthesizer 2 is produced from the terminal OUT thereof.

In the embodiment described above, the terminal A3 of the speech synthesizer 2 is selected and the "response only" message is produced when the incoming message recording tape reaches its end or an external tape recorder is not connected to the apparatus. However, reception of a call may be inhibited when the incoming message recording tape reaches its end or an external tape recorder is not connected to the apparatus.

What is claimed is:

1. An automatic telephone answering apparatus comprising:
   (a) relay means operated to be self-held in response to a call signal, and released by a momentary release circuit operated in response to a signal generated when a caller hangs up a receiver;
   (b) means responsive to an operation of said relay means for transmitting an audio signal through a telephone line to a tape recorder;
   (c) means for producing a signal to drive said tape recorder upon operation of said relay means;
   (d) means for selecting a first synthesized message from a speech synthesizer upon operation of said relay means and for delivering the first synthesized message to the caller;
   (e) means for disabling said momentary release circuit during a tie interval in which a message is produced from said speech synthesizer;
   (f) timer means operated upon operation of said relay means;
   (g) means for selecting a second synthesized message from said speech synthesizer when said timer means is turned off and for delivering the second synthesized message to the caller;
   (h) means for releasing said relay means by detecting a time-off signal from said timer means and an end of delivery of the second synthesized speech message from said speech synthesizer; and
   (i) means controlled by self-holding operation of said relay means for applying an operating current to means (b)–(h).

2. An apparatus according to claim 1, wherein said tape recorder has a recording tape end detecting means, said timer means is forcibly turned turned off by a switching circuit which is operated in response to a tape end detection signal from said detecting means to determine whether or not recording can be performed, and said relay means is released after the second synthesized message from said speech synthesizer is produced.

3. An apparatus according to claim 2, wherein said switching circuit serves to release said relay means after only a third synthesized message is produced from said speech synthesizer upon reception of subsequent calls after the recording tape has reached an end thereof.

4. An apparatus according to claim 2, wherein said switching circuit serves to select only the third synthesized message from said speech synthesizer when said tape recorder is not connected to said automatic telephone answering apparatus, to deliver only the third synthesized message to all incoming calls, and to release said relay means.

* * * * *